United States Patent
Caperton, Jr.

[15] 3,660,903
[45] May 9, 1972

[54] DRAWING AID

[72] Inventor: George H. Caperton, Jr., 1850 Hilliard Rd. Apt. 104, Rocky River, Ohio 44116

[22] Filed: July 28, 1969

[21] Appl. No.: 846,312

[52] U.S. Cl. .................................... 33/64 D, 33/1 K, 35/26
[51] Int. Cl. ................................................. G01c 3/00
[58] Field of Search ................... 35/62, 63, 26, 1 K; 33/64 D; 297/136–160; 108/12, 19 CE; 248/441, 460

[56] References Cited

UNITED STATES PATENTS

| | | | |
|---|---|---|---|
| 871,934 | 11/1907 | Henderson | 35/63 X |
| 1,083,215 | 12/1913 | Lewis | 108/19 X |
| 1,415,833 | 5/1922 | Ginsburg | 33/64 D |
| 1,821,252 | 9/1931 | Woods | 33/64 D |
| 1,924,945 | 8/1933 | Klotz | 108/12 |
| 1,992,083 | 2/1935 | McDonald | 33/64 D X |
| 2,196,044 | 4/1940 | Tyrrell | 35/63 X |
| 2,263,101 | 11/1941 | Perry | 33/64 D |

Primary Examiner—William D. Martin, Jr.
Attorney—Frederic B. Schramm

[57] ABSTRACT

As a drawing aid a plurality of sets of grids of different line spacings are drawn on transparent flexible sheet material and mounted on spaced rollers so that one or another of the set of grids can be turned into view according to the nature of the subject to be drawn as seen through the transparent grid sheet. A drawing surface has grids of similar spacing marked thereon for use in reproducing the subject seen through the grid of the transparent sheet. The grid rollers are mounted on a collapsible structure which is convertible from a drawing table to an easel.

4 Claims, 8 Drawing Figures

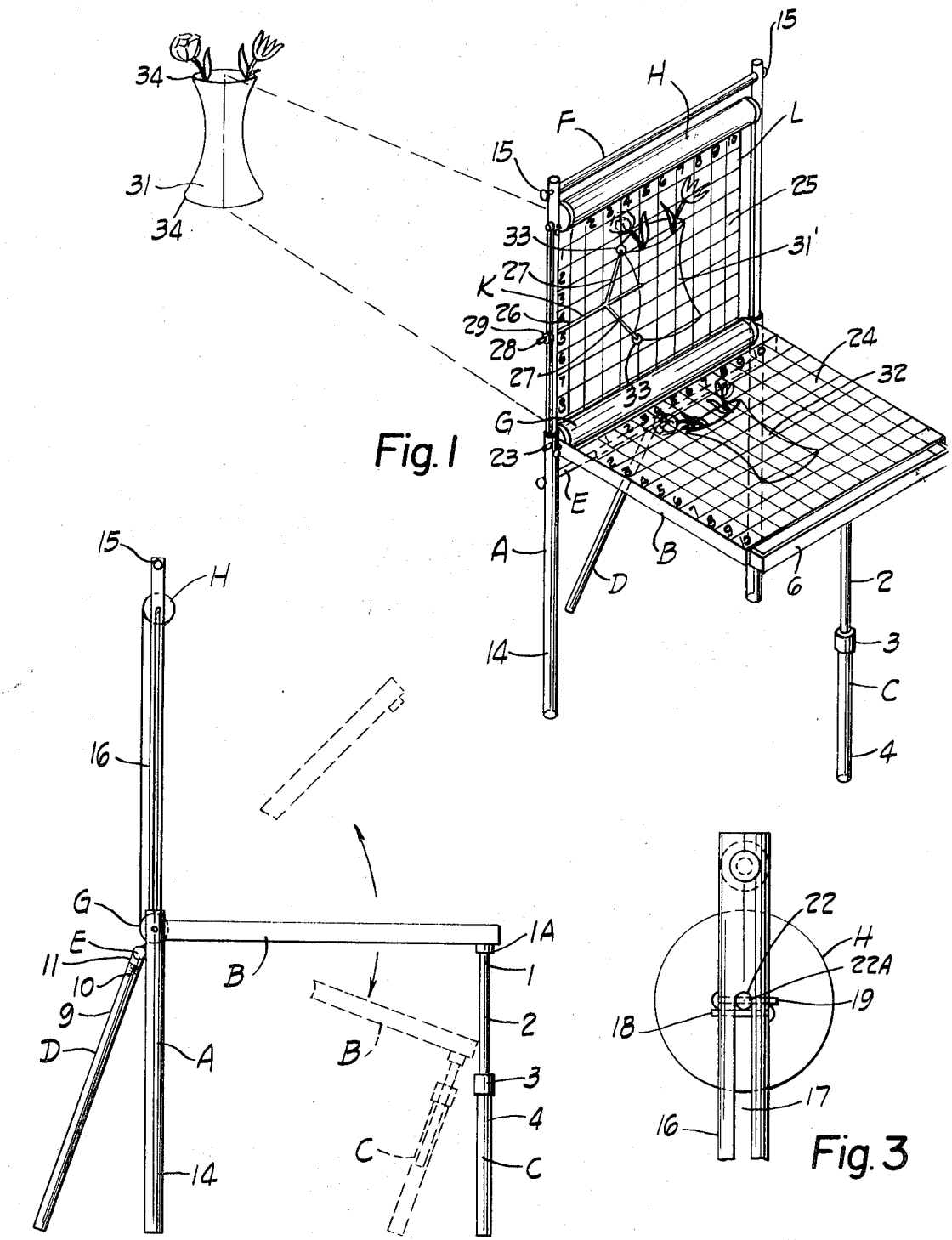

INVENTOR.
GEORGE H. CAPERTON, Jr.
BY
Frederic B. Schramm
ATTORNEY.

DRAWING AID

BRIEF DESCRIPTION

A convertible easel and drawing table is formed with collapsible legs and braces and a table surface hinged to vertical legs between upper and lower ends thereof with grid rolls mounted between the vertical legs at the upper ends and near the point of connection of the table. A sheet of transparent material having a plurality of grids with different spacings thereon is mounted on the rollers in such a manner that a grid of one spacing or another may be brought into view by rotating the rollers. The table surface is adapted to support a drawing surface with a grid marked thereon corresponding to one of the grids of the transparent sheet material for enabling a person drawing to observe a subject through one of the transparent surface grids, observing the coordinates on the grid of significant points of a subject and drawing marks on the table surface grid corresponding in coordinates thereto. One of the bracing legs is alternatively positioned at the front of the table for supporting it when forming a drawing table and secured to a cross member between the vertical legs for forming an easel brace. For portraiture grids are employed comprising spaced loops and intersecting parallel straight lines.

BACKGROUND AND OBJECTS

Beginners in the art of drawing and painting may encounter difficulty in free hand drawing or painting of outlines because initially they are not fully able to visualize form, proportion and perspective well enough to produce acceptable work. It is accordingly an object to provide an aid to beginners in learning the techniques of drawing as well as to provide a time saving device for commercial artists and devotees of the fine arts in making preliminary sketches for paintings.

A more specific object is to enable even a relatively inexperienced artist to draw and to see for himself the correlation of lines in a dimensional subject.

Since art is a visual experience merely consisting of lines, it is an object of the invention to cause the eye to become more sensitive to line, thus reducing for the individual a total visual experience into very basic elements, the very basic elements that make up art.

A further object of the invention is to break down the whole of the visual appearance of a subject into its parts.

This is accomplished by the use of grid lines as a fundamental break down to the eye. It enables the individual to draw what he sees through the grid onto the paper. In this manner the continual use of the device in accordance with the invention will eventually enable a person to draw without the use of the grid.

The invention is directed toward aid in free hand drawing and not the type of rendering which might be produced by an architect or mechanical draftsman with drafting tools.

In using the invention the artist is seated in front of the subject and simply correlates the points seen through the transparent grid with the corresponding grid on the drawing paper.

Still another object of the invention is to provide apparatus which is sturdy and reliable but nevertheless light and may readily be collapsed for carrying and use in the field.

Still another object of the invention is to provide apparatus which may readily be converted from a drawing table to an easel and vice versa.

Other and further objects, features and advantages of the invention will become apparent as the description proceeds.

DRAWINGS

A better understanding of the invention will be afforded by the following detailed description considered in conjunction with the accompanying drawings in which FIG. 1 is a perspective view of an embodiment of the invention illustrating the manner in which it is employed.

FIG. 2 is a side elevation of the apparatus illustrated in FIG. 1 illustrating the manner of folding the apparatus for carrying and also the procedure for converting the table into an easel.

FIG. 3 is an enlarged fragmentary view of the upper portion of the apparatus of FIG. 2.

Figure 4:
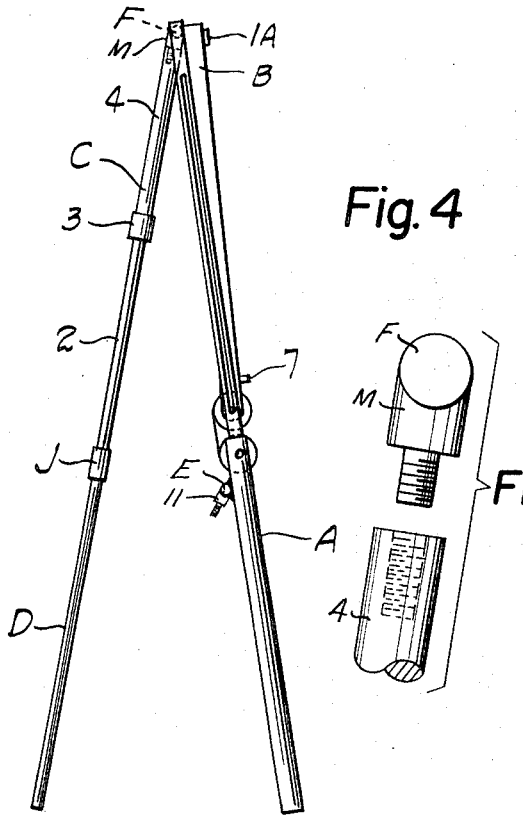
FIG. 4 is a side elevation of the apparatus of FIGS. 1, 2, and 3 converted into an easel.
Figure 4A:
Figure 5:
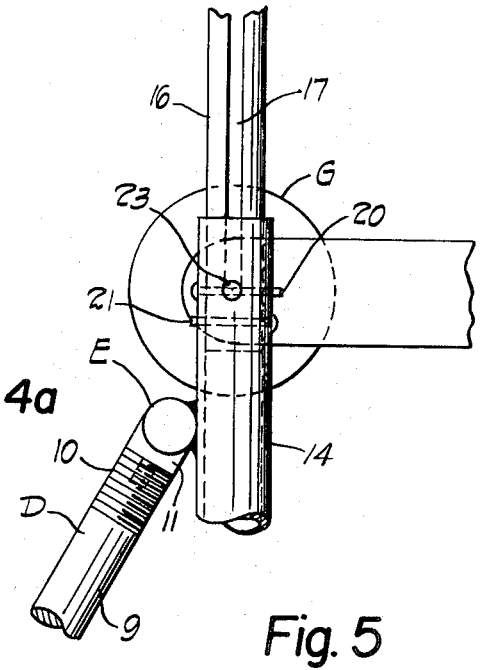
FIG. 5 is an enlarged fragmentary view of a portion of the apparatus of FIG. 2 illustrating the pivotal connection of the grid supporting legs to the drawing table and the connection to the back brace.
Figure 7:
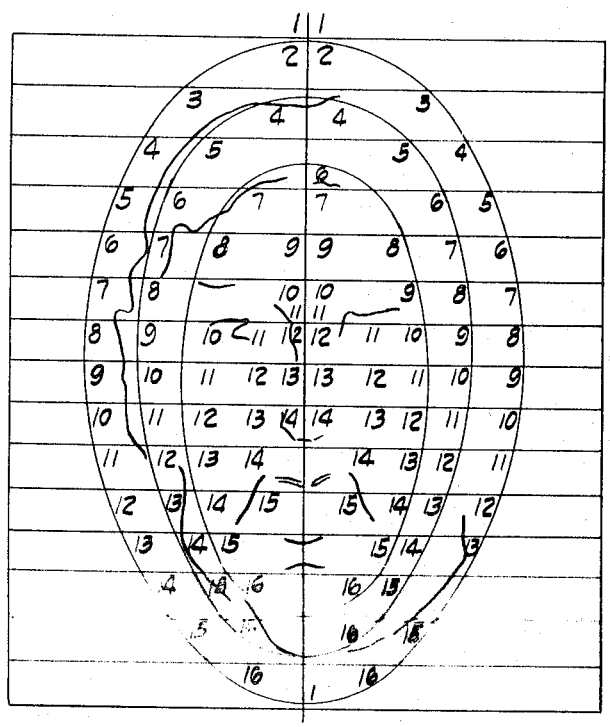
Figure 6:
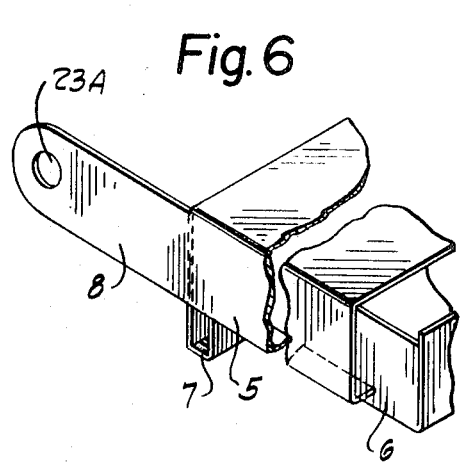

FIG. 6 is an enlarged fragmentary perspective view of the drawing table of the apparatus of FIGS. 1, 2, and 4 to show the construction more clearly and to illustrate the manner of using the table as a support for drawers to carry artist supplied and parts of the apparatus when knocked down, and FIG. 7 is a view of a form of grid which would be employed on the transparent grid sheet and the drawing paper for portraiture.

Like reference characters are utilized throughout the drawing to designate like parts.

DESCRIPTION OF THE APPARATUS

The apparatus forming an illustrative embodiment of the invention comprises a pair of telescoping vertical legs A for supporting a combination table top and easel top B and supporting a transparent grid. There is a telescoping leg C for supporting the front of the table B or alternatively serving as the top end or section of an easel brace. A back brace D is provided for the table which serves alternatively as the lower part of an easel brace. A cross member E is fixed to the vertical telescoping legs A for supporting them in spaced relation and providing a connection for the table back brace D.

There is an upper cross member F which is rotatably mounted between the upper ends of the vertical legs A to permit a pivoted easel brace, consisting of section C and D, to be secured to the upper end of the apparatus by a joint M engaging the end of a tubing 4 of easel brace section C.

In order that the transparent viewing screen may be mounted in front of the artist and selected portions of the sheet L carrying the viewing screens may be brought into view, a pair of grid rolls is mounted between the vertical supporting legs A. These consist of a lower grid roll G, which is laterally fixed although free to rotate, and an upper grid roll H, which is movable laterally as well as being rotatable.

A coupling J is provided for joining the easel back brace sections C and D when the apparatus is converted to use as an easel.

A key K, pivotally mounted in one of the vertical legs A, is provided to aid the artist in aligning his grids with his subject to be drawn in the event it it necessary to remove the apparatus and resume drawing at a later date by reasons of interruptions such as darkness or the like.

STRUCTURAL DETAILS

The upper end 1 of the table front telescoping leg C is threaded to be received in a threaded socket formed in boss 1A on the under surface of the table top B. The telescoping leg C is formed in three parts including a length of tubing 2 for the upper end, a threaded telescoping locking device 3 of conventional construction and a lower length of tubing 4 threaded at the upper end to receive the locking device 3 and of sufficient diameter to receive the upper length of tubing 2.

The combination table top and easel back B is of hollow construction as illustrated in FIG. 6 comprising a rectangular housing portion 5 adapted to receive a drawer 6, the housing portion 5 is also formed with a lower end rear projection 7 which serves as a canvas rest when the table B is turned upward to a vertical position as in FIG. 4 to form an easel. The sides of the housing 5 extend backward to form pivot arms 8.

The upper end 9 of the brace D is externally threaded at 10 to be received within the coupling J when serving as an easel brace and internally threaded for connection at the back of the table B to serve as a table brace. In order to enable the latter connection to be made, a threaded screw joint 11 is joined as by welding or the like to the center of the lower cross member E, which is in turn joined by welding or the like to the back of the vertical legs A. Suitable means such as screws 15 are provided for rotatably mounting the upper cross member F, which serves as a back rest for the table top B when serving as an easel in the upper position illustrated in FIG. 4.

The vertical legs A comprise a lower tubular portion 14 and a telescoping frame 16 formed with a slot 17 for enabling the upper grid roll H to be adjusted laterally in position and to be secured by means of locking pins 18 and 19. The telescoping frame 16 is provided with openings to receive the locking pins 18 and 19 which co-act with a central tube rod 22 passing through the center of the upper grid roll H and secured thereto. The locking pin 18 rests under the rod 22 when the grid roll H is in its uppermost position. A transverse opening 22A is provided in the rod 22 to receive the locking pin 19 when the grid rolls have been rotated to the position exposing the desired grid so as to maintain the grid sheet in the proper position. Corresponding lower locking pins 20 and 21 are provided for supporting the central tube rod 23 of the lower grid roll G and preventing it from turning.

The grid rolls G and H carry a length of transparent flexible sheet material L of sufficient length to have a plurality of grids 25 marked thereon each of such size as to fill the space substantially between the grid roll G and H when they are mounted in their extended position. The various grids are of different degrees of fineness or spacing of lines so that an appropriate grid may be selected for the type of subject being drawn. In addition to the rectilinear coordinate grid 25 shown in FIG. 1 other types of grids are also included in those marked on the length of sheet material. For example, some of the grids may be of the closed elongated curve and horizontal cross line type for portraiture work illustrated in FIG. 7.

A sheet or pad of drawing, painting or sketching canvas, paper or other material is provided, resting upon the surface of the drawing table B and having grid lines 24 conforming in arrangement and spacing to those of the grid 25 on the transparent sheet carried by the grid rolls G and H. The lines of the grid 24 may be drawn in soft pencil or charcoal to facilitate their removal if desired after the drawing of the subject has been completed. It will be understood that this is unnecessary if an opaque pigment such as oil color is employed for painting the subject directly from the view through the grid 25 or for covering light pencil lines employed in laying out the picture to be produced on the surface of the sheet resting on the table B.

The key K comprises an arm 26 and a pair of spreaders 27 hinged thereto adjustable in position. The end 28 of the arm 26 passes through the slot 17 in one of the upright frame portions 16 of the vertical leg A, and the end 28 is threaded to receive lock nuts 29 on either side of the frame 16. The lock nuts 29 are threaded for adjustably supporting the key K with regard to both the horizontal and vertical positions. The spreaders 27 may be formed with circular ends 33 to act as sights. They are adjustable in position so as to provide an additional aid to the artist in aligning an object to be drawn with the grid 25. This is particularly useful in case it should be necessary to take down the equipment and set it up again after an interruption in order that the artist can reestablish the same view of the subject which he had when previously drawing.

METHOD OF USING THE APPARATUS

If it is assumed that an artist desired to reproduce a landscape, still life or other subject he sets up the apparatus illustrated in FIG. 1 with the grid 25 vertically supported and the drawing table B in horizontal position. He then observes the subject to be drawn through the transparent sheet grid 25. If the subject is a still life such as a vase 31, the artist observes the outline of the vase 31 upon the transparent sheet grid 25 and it appears as a configuration 31'. Observing the intersections of the outline of the object 31 with the lines of the grid 25, the artist draws into the same coordinates on the drawing grid 24 and produces the drawing 32. As an aid in doing this the grids 24 and 25 may have the squares or coordinates numbered as indicated.

If for any reason it is necessary for the artist to remove the drawing table before he has completed the drawing, he first adjusts the key K so as to indicate the key points of the subject. For example, in the case of the vase 31 he adjusts the spreader arms 27 so that the circles 33 at the ends sight upon significant points, for example corners 34 of the subject. The key K is then left in this position until the artist resumes whereupon he sets up the table again in the same position by adjusting back and forth until the sighting circles 33 again sight upon the corners 34 of the subject 31.

After the artist has completed the pencil or charcoal sketch, if he desires to paint the subject from an easel he removes the locking pins 18 and 19 to permit the upper grid roll H to be lowered and removes the front leg C and the bracing leg D, connecting them together to form an easel bracing leg as illustrated in FIG. 4. The table B is then turned upward around pivot holes 23A in the arms 8 with the upper end of the table resting against the cross rod F.

The opening 23A in the extensions 8 of the table top B engage the center rod 23 of the lower grid roll G for pivoting the table B and enabling it to be moved back and forth between the positions shown in FIGS. 1 and 4. The drawer 6 may be used not only for holding drawing paper and supplies, but also for holding the telescoping legs C and D when not in use while the equipment is carried.

Since the form of grid shown in FIG. 7 includes ovals or closed elongated curves as one set of lines instead of the vertical lines of the coordinates of the grids 24 and 25 of FIG. 1, it may readily facilitate the drawing of objects having outlines more nearly corresponding to the curved shape of the closed curvilinear lines. Any suitable numbering system may be employed for identifying the curvilinear grid lines and straight horizontal grid lines. For example, as shown in FIG. 7, the closed curves are identified by numerals marked along the center axis and the horizontal grid lines are identified by numerals placed along the outermost closed curve.

In drawing the head partially sketched in FIG. 7, it will be observed that the outline of the head follows quite closely the configuration of the closed curve marked No. 4 and the hairline is located by the next lower curve and the locations of eyebrows, tip of the nose, lips, chin and so forth are identified by the horizontal grid lines.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore to cover all such modifications and variations as fall within the scope of the invention.

What is claimed is:

1. A drawing aid comprising in combination a pair of spaced rollers

A sheet of transparent, flexible material mounted on said rollers, said material having a plurality of grids with different grid spacings thereon in different portions thereof, said rollers being spaced to provide a sufficient distance between them for one grid at a time to be supported between the rollers, and the rollers being rotatable to bring one of said grids selectively into view between the rollers, A drawing surface having a grid marked thereon corresponding to one of the grids on said transparent sheet material, Means for rotating the rollers to bring selected grid into view and Means for supporting said grid rollers and the drawing surface in position for enabling a subject to be drawn to be observed through one of the grids of the transparent surface while the drawing surface is being drawn upon.

2. A drawing aid comprising in combination a pair of vertical legs having upper ends A table with a back pivotally secured on said legs and with a front Bracing leg means having means for securing it to the front of said table for forming a front table leg A cross member between the upper ends of said vertical legs A lower grid roll rotatably mounted between said vertical legs near said table, An upper grid roll mounted between said vertical legs near said cross member, and A sheet of transparent, flexible material mounted on said grid rolls, said material having a plurality of grids with different grid spacing thereon in different portions thereof, each grid having a size corresponding substantially to the spacing between the grid rolls, the grid rolls being rotatable to bring one of said grids selectively into view between the rolls.

3. A drawing aid as in claim 2 in which the upper grid roll is adjustable in position with respect to movement transverse to its axis and the said vertical legs are telescopic whereby the drawings aid may be folded in compact form for carrying.

4. A drawing aid as in claim 2 wherein a key is provided adjustably secured to one of said vertical legs and having a plurality of prongs adapted to lie along the grid surface of the transparent sheet for marking significant points of a subject to be viewed through the transparent sheet grid.

* * * * *